(12) United States Patent
Chen et al.

(10) Patent No.: US 9,648,518 B2
(45) Date of Patent: May 9, 2017

(54) DYNAMIC SELECTION OF COEXISTENCE PROFILES FOR IMPROVED WI-FI/BLUETOOTH COEXISTENCE

(71) Applicant: Apple Inc., Cupertino, CA (US)

(72) Inventors: Camille Chen, Cupertino, CA (US); Aarti Kumar, San Jose, CA (US); Vladimir Trukhin, San Ramon, CA (US); Sarin S. Mehta, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/871,883

(22) Filed: Sep. 30, 2015

(65) Prior Publication Data

US 2016/0262056 A1 Sep. 8, 2016

Related U.S. Application Data

(60) Provisional application No. 62/129,629, filed on Mar. 6, 2015.

(51) Int. Cl.
*H04W 28/20* (2009.01)
*H04W 4/00* (2009.01)
*H04W 72/08* (2009.01)

(52) U.S. Cl.
CPC ........... *H04W 28/20* (2013.01); *H04W 4/008* (2013.01); *H04W 72/082* (2013.01)

(58) Field of Classification Search
CPC .................................................... H04W 28/20
See application file for complete search history.

(56) References Cited

U.S. PATENT DOCUMENTS

| 8,599,709 | B2 | 12/2013 | Chen et al. | |
|---|---|---|---|---|
| 9,072,077 | B2* | 6/2015 | Wietfeldt | H04W 72/02 |
| 2006/0003802 | A1* | 1/2006 | Sinai | H04W 88/06 |
| | | | | 455/553.1 |
| 2012/0170561 | A1* | 7/2012 | Tsai | H04W 16/14 |
| | | | | 370/338 |
| 2012/0207032 | A1* | 8/2012 | Chen | H04W 28/18 |
| | | | | 370/252 |

(Continued)

*Primary Examiner* — Christopher M Brandt
(74) *Attorney, Agent, or Firm* — Meyertons Hood Kivlin Kowert & Goetzel, P.C.; Jeffrey C. Hood

(57) ABSTRACT

A device may store a plurality of different coexistence profiles for different possible communication scenarios. The device may be initialized with a first one of the coexistence profiles, and may operate to dynamically switch to different ones of the coexistence profiles based on current conditions. Each coexistence profile may include a number of coexistence related parameters stored as a plurality of data structures. During device use, the device may dynamically select an appropriate coexistence profile based on the current communication conditions, such as Wi-Fi RSSI, Bluetooth RSSI, and/or the number of Wi-Fi and/or Bluetooth devices with which communication is currently occurring, among other possible factors. The coexistence profile is selected to provide the best possible Wi-Fi and/or Bluetooth output performance based on current conditions. The device may repeatedly dynamically select different coexistence profiles as conditions change, e.g., may select different coexistence profiles on a second or even millisecond basis.

20 Claims, 4 Drawing Sheets

(56) References Cited

U.S. PATENT DOCUMENTS

2014/0126397 A1 5/2014 Hansen et al.
2014/0219193 A1 8/2014 Linde et al.
2015/0024687 A1 1/2015 Rawat et al.

* cited by examiner

DYNAMIC SELECTION OF COEXISTENCE PROFILES FOR IMPROVED WI-FI/BLUETOOTH COEXISTENCE

PRIORITY CLAIM

The present application claims benefit of priority of U.S. provisional application No. 62/129,629 titled "Dynamic Selection of Coexistence Profiles for Improved Wi-Fi/Bluetooth Coexistence" and filed on Mar. 6, 2015, which is hereby incorporated by reference in its entirety as though fully and completely set forth herein.

FIELD OF THE INVENTION

The present application relates to wireless communication, including coexistence of different wireless radio access technologies in a single device, e.g., by mitigating the effects of electromagnetic signal interference in devices implementing two or more wireless protocols, such as Bluetooth and Wi-Fi.

DESCRIPTION OF THE RELATED ART

Wireless communication systems are rapidly growing in usage. In recent years, wireless devices such as smart phones and tablet computers have become increasingly sophisticated. In addition, electronic devices are now expected to communicate using short range communication protocols with numerous other types of wireless devices, including user interface devices such as keyboards, mice, headsets, remote controls, etc. Additionally, different short range wireless communication technologies and standards are being used by these devices, such as IEEE 802.11 (WLAN or Wi-Fi), and BLUETOOTH™, among others.

With the growth of Bluetooth (BT) popularity, especially Bluetooth Low Energy (BTLE), consumer electronics products are being developed which will connect with multiple Bluetooth devices. For example, a computer may connect with a Bluetooth mouse/trackpad, keyboard, headset/speaker, remote controller, stylus, healthkit, homekit, smart watch, etc. Bluetooth technology may also be used to maintain connectivity with legacy Bluetooth devices. In addition, users are demanding increased Wi-Fi performance as Wi-Fi is used for multiple applications, such as email, web surfing, video streaming, file downloading, and various peer to peer communication protocols, such as Apple Wireless Direct Link (AWDL), e.g., Airdrop, Airplay, etc. With the use of Wi-Fi in many peer to peer applications, Wi-Fi communication is generally required to switch between different frequency bands much more often, almost in a frequency hopping manner, causing communication coexistence issues.

User equipment devices (UEs) thus may have multiple radio interfaces that support multiple radio access technologies (RATs) as defined by various wireless communication standards (e.g., Wi-Fi, BLUETOOTH™, LTE, LTE-A, UWB (Ultra-wideband), etc.). Accordingly, the UE may need to simultaneously operate multiple radio interfaces corresponding to multiple RATs (e.g., Wi-Fi, BLUETOOTH™ and/or LTE/LTE-A). However, constraints such as cost, size, and antenna isolation in these devices may introduce difficulties, which can potentially result in a poor user experience. For example, both Bluetooth and WLAN (802.11b/g/n) share the same ISM band in the 2.4-2.4835 GHz frequency range. Due to the close physical proximity of these wireless interfaces (including their antennas) in these devices, the Bluetooth and WLAN technologies can interfere with each other when operating simultaneously, and can cause problems such as Bluetooth audio stutter and drop-outs, slow WLAN transfer speeds, poor Bluetooth mouse (MS) tracking, link dropouts, etc. For small mobile devices, a shared antenna for different radio technologies is common, and thus this presents challenges for ever increasing performance requirements In addition to the above applications/use cases, the following situations below further make the problem even more challenging:

(1) Based on survey data, the majority of consumers still use a legacy Access Point (AP), especially at home. These APs only support 802.11b/g/n in the 2.4 GHz range, which has a direct conflict with Bluetooth devices due to the shared frequency. Furthermore, many users still use an 802.11g (1×1 stream) AP, which has an upper limit of around 22 Mbps.

(2) New consumer devices are being designed to be smaller, lighter, and more aesthetic, which makes it increasingly difficult to deliver high performance in a small form factor. Devices need to have good performance in any use conditions, such as open lid, clam shell mode, hold on the hand, put on the floor or on the desk, etc.

(3) Wi-Fi is now being used in a host of new applications, including many peer to peer applications where the device is required to shift among different channels (frequencies) at a much higher rate than was previously required. Thus, modern Wi-Fi devices essentially implement frequency hopping in different Wi-Fi bands, due to the need to switch communications among different peer devices and an access point.

(4) With more and more popularity for Wi-Fi everywhere, including homekit, healthkit, hotspot, etc., non co-located interference makes interference mitigation even more challenging.

SUMMARY OF THE INVENTION

Embodiments are presented herein of, inter alia, improved systems and methods for coexistence of different wireless radio access technologies, e.g., mitigating the effects of electromagnetic signal interference in devices implementing two or more wireless protocols, such as Bluetooth and Wi-Fi.

Some embodiments may be implemented in a device that comprises at least one antenna, a first radio that implements a first radio access technology (e.g., Wi-Fi), and a second radio that implements a second radio access technology (e.g., Bluetooth). The device may be configured to communicate with one or more other Wi-Fi devices and one or more Bluetooth devices concurrently.

The device may store a plurality of different coexistence profiles for different possible communication scenarios. The device may be initialized with a first one of the coexistence profiles, and may operate to dynamically switch to different ones of the coexistence profiles based on current conditions. Each coexistence profile may include a number of coexistence related parameters, which may include: mode, desense on/off, desense level, desense thresholds, SISO ack array, TX chain power offsets, an adaptive frequency hop (AFH) map, and/or roaming threshold among possible others. The coexistence profiles may be stored as a plurality of data structures, and a lookup table may be used for faster selection.

In selecting one of the coexistence profiles, the device may examine one or more of the Wi-Fi RSSI (Received Signal Strength Indicator), the Bluetooth RSSI, and the number of Wi-Fi and/or Bluetooth devices with which communication is currently occurring, among other possible factors. The device may then dynamically select an appropriate coexistence profile based on one or more of the Wi-Fi RSSI, the Bluetooth RSSI, and the relative number of different devices. The coexistence profile is selected to provide the best possible Wi-Fi and/or Bluetooth output performance based on current conditions. The device may repeatedly dynamically select different coexistence profiles as conditions change, e.g., may select different coexistence profiles on a second or even millisecond basis.

Note that the techniques described herein may be implemented in and/or used with a number of different types of devices, including but not limited to, computer systems, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
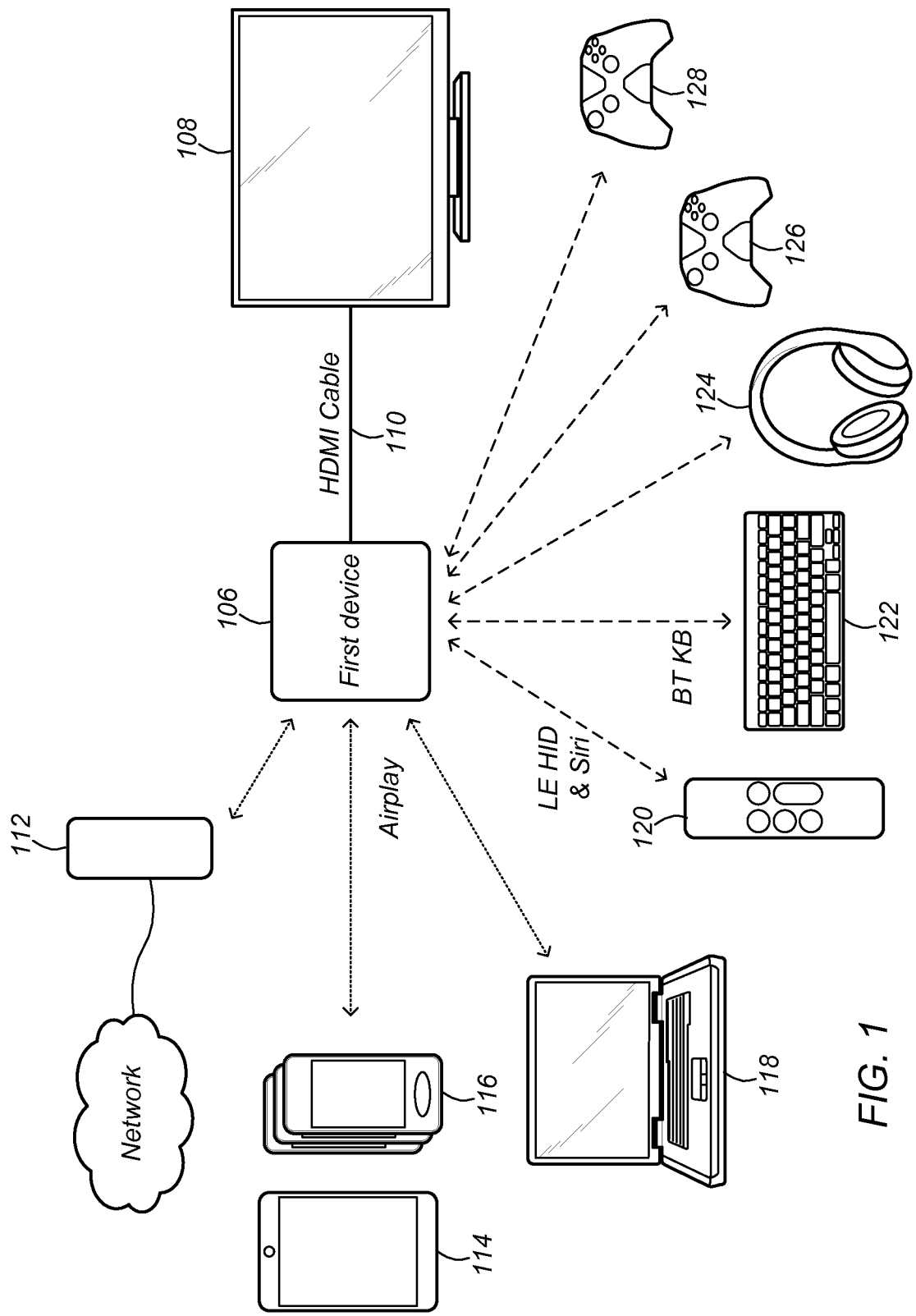
FIG. 1 illustrates an example wireless communication system where a first device connects over BT and Wi-Fi to various other devices.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
UE: User Equipment
RF: Radio Frequency
AP: Access Point
BT: Bluetooth
BTLE: Bluetooth Low Energy
BTLEA: Bluetooth Low Energy for Audio
TDD: Time Division Duplexing
TX: Transmission/Transmit
RX: Reception/Receive
LAN: Local Area Network
WLAN: Wireless LAN, also referred to as Wi-Fi
RAT: Radio Access Technology
RSSI: Received Signal Strength Indicator
Wi-Fi: Wireless Local Area Network (WLAN) RAT based on the Institute of Electrical and Electronics Engineers' (IEEE) 802.11 standards

Terms

The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Bluetooth—The term "Bluetooth" has the full breadth of its ordinary meaning, and at least includes any of the various implementations of the Bluetooth standard, including Bluetooth Low Energy (BTLE) and Bluetooth Low Energy for Audio (BTLEA), among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Example First Device Connecting to BT Devices

FIG. 1 shows an example first device 106, which connects over Bluetooth (BT) with various BT devices, such as remote Game Controllers (GC), a headset or speaker, keyboard, etc. The headset may be either A2DP (Advanced Audio Distribution Profile) or eSCO (extended Synchronous Connection Oriented). In addition, the first device can stream video/audio/movies/games from the Internet and connect with a computer operating system for sharing content and/or a display (e.g., using Apple Airplay or similar technology). In the example shown in FIG. 1, the first device is shown as being connected with 5 BT devices, these being the two BT game controllers, the BT headset, the BT keyboard and the BT remote control device. The first device is also shown as being connected over Wi-Fi to a phone, a computer, and a Wi-Fi access point. In this example embodiment, the first device is an AppleTV device, but the device may be any of various types of devices. The first device 106 may comprise a processing element, and a memory which may be comprised in or coupled to the processing element. The processing element may be configured to perform operations described herein.

Figure 2:
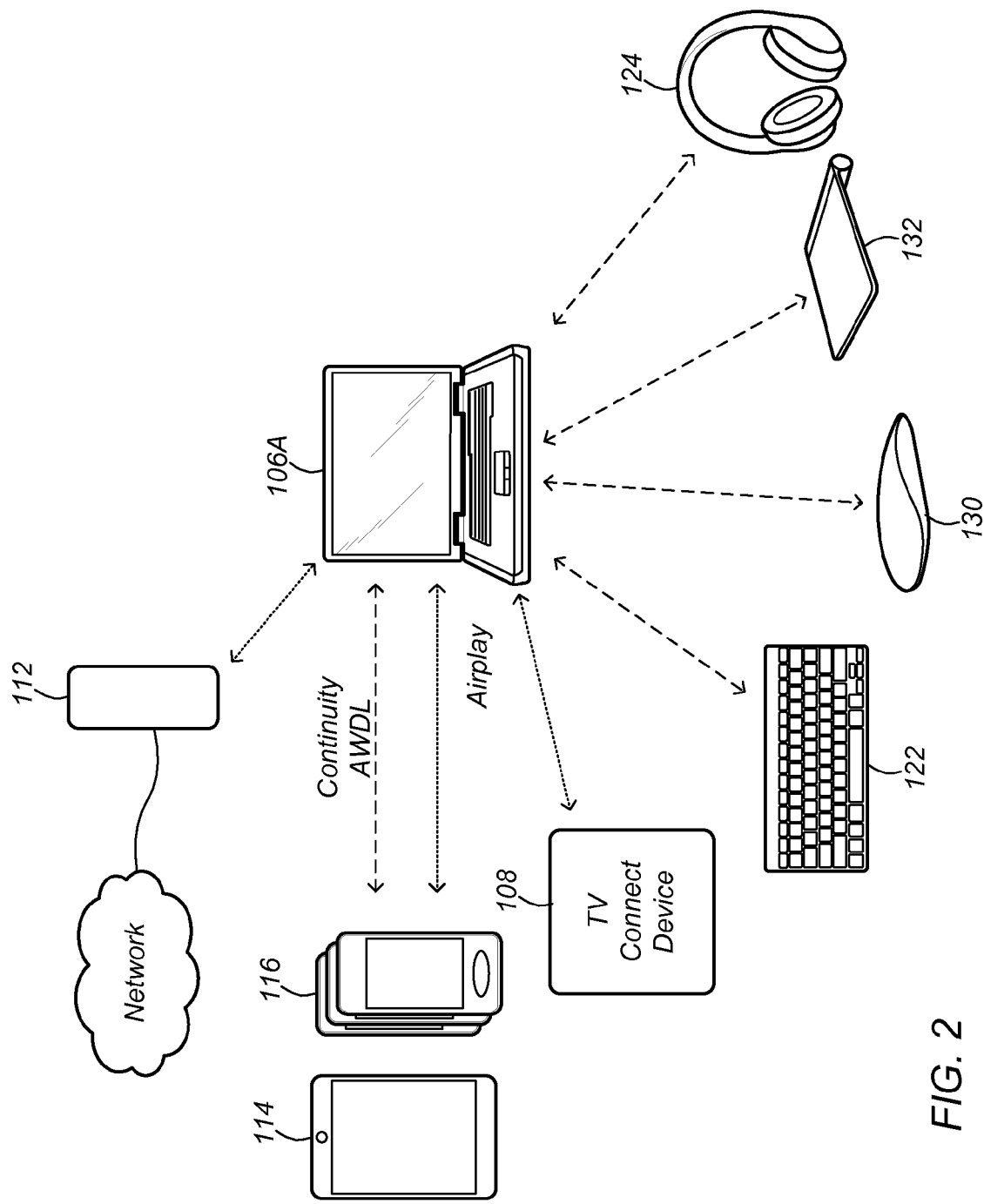
FIG. 2 illustrates an example wireless communication system where a first computer system connects over BT and Wi-Fi to various other devices.

FIG. 2—Example First Computer System Connecting to BT Devices

FIG. 2 shows an example first computer system 106a connected to various devices. In this example embodiment, the first computer system is shown connected to a BT mouse, keyboard, and trackpad, and may also simultaneously connect to headphones/speaker. In addition, the first computer system can communicate with other devices via other communication technologies, such as Wi-Fi, to other devices, such as smart phone and a television interconnect device. For example, where the computer is an Apple MacBook, the computer may connect to other Mac/iOS devices through Apple Wireless Direct Link (AWDL), e.g., using Airdrop, Airplay and/or Continuity.

Wi-Fi/BT coexistence solutions include:

(1) Simultaneous Wi-Fi/BT operation if Wi-Fi and BT antenna isolation is good. In some embodiments, good Wi-Fi and BT antenna isolation may require greater than or equal to 35 dB per Wi-Fi chain to BT antenna.

(2) A hybrid Wi-Fi/BT coexistence solution if isolation is reasonable. In some embodiments, reasonable isolation may require greater than or equal to 20 dB. The hybrid Wi-Fi/BT coexistence solution may allow Wi-Fi Rx with BT Tx/Rx with controlled condition: Wi-Fi Tx, BT Tx, Wi-Fi/BT desense, shared chain on/off (3) Exclusive time sharing or time division duplex (TDD) if the device only has one shared antenna or isolation is poor.

In some current computer systems, a coexistence solution is implemented under the assumption that the Wi-Fi network is "static". In other words, it is assumed that the Wi-Fi device is only connected with the AP and it does not change channel or band frequently. However, this assumption may not apply to many types of newer devices as the device Wi-Fi may need to support various peer to peer communication technologies, which can involve changing bands much more frequently, e.g., at time periods less than 64 ms.

Figure 3:
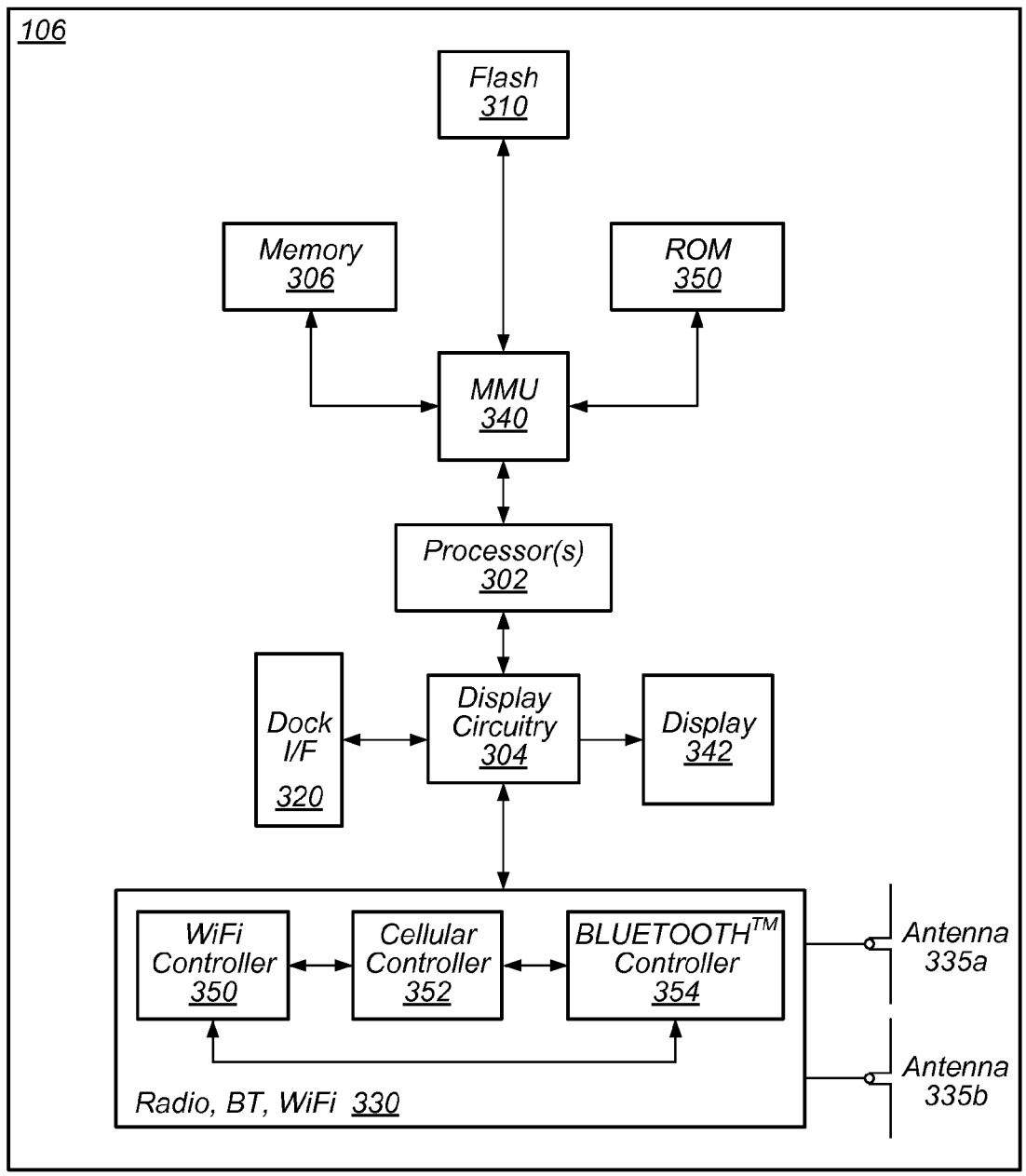
FIG. 3 illustrates an exemplary block diagram of a device, according to one embodiment.
Figure 4:
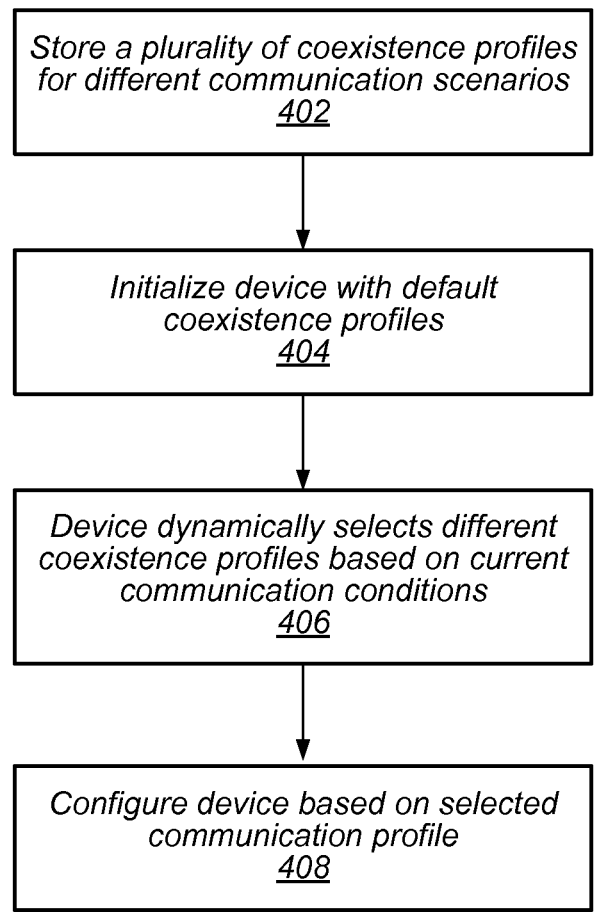
FIG. 4 is a flowchart illustrating one embodiment of coexistence profile selection.

FIG. 3—Example Block Diagram of a Device

FIG. 3 illustrates an exemplary block diagram of a device 106, such as the first device in FIG. 1 or 2. As shown, the device 106 may include a processing element, such as processor(s) 302, which may execute program instructions for the device 106. The device 106 may also comprise display circuitry 304 which may perform graphics processing and provide display signals to the display 342. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, radio 330, connector I/F 320, and/or display 342. The MMU 340 may be configured to perform memory protection and page table translation or set up. In some embodiments, the MMU 340 may be included as a portion of the processor(s) 302.

As shown, the processor 302 may be coupled to various other circuits of the device 106. For example, the device 106 may include various types of memory, a connector interface 320 (e.g., for coupling to the computer system), the display 342, and wireless communication circuitry (e.g., for Wi-Fi, BLUETOOTH™, LTE, LTE-A, GPS, etc.). The device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include more antennas. Overall, the one or more antennas are collectively referred to as antenna 335. For example, the device 106 may use antenna 335 to perform the wireless communication with the aid of radio 330. As noted above, the UE may be configured to communicate wirelessly using multiple wireless communication standards in some embodiments.

As described further subsequently herein, the device 106 may include hardware and software components (a processing element) for implementing methods for optimized coexistence of multiple RATs on device 106, e.g., for implementing methods for improved coexistence of Wi-Fi and Bluetooth. For example, the device may store and execute a Wi-Fi software driver for controlling Wi-Fi operations. The device may also comprise Bluetooth firmware (FW) or other hardware/software for controlling Bluetooth operations. The device 106 may be configured to implement part or all of the methods described herein, e.g., by executing program instructions stored on a memory medium (e.g., a non-transitory computer-readable memory medium) and/or through hardware or firmware operation. In other embodiments, the methods described herein may be at least partially implemented by a programmable hardware element, such as an FPGA (Field Programmable Gate Array), and/or as an ASIC (Application Specific Integrated Circuit). Thus the device 106 is configured to implement optimized coexistence of multiple RATs (e.g., Wi-Fi and Bluetooth) for wireless communications using these multiple RATs, and further to implement time-sharing between different RATs for in-device coexistence according to various embodiments disclosed herein.

In some embodiments, radio 330 may include separate controllers dedicated to controlling communications for various respective RAT standards. For example, as shown in FIG. 3, radio 330 may include a Wi-Fi controller 350 and a BLUETOOTH™ controller 354, and may also comprise a cellular controller (e.g. LTE controller) 352. In some embodiments, one or more or all of these controllers may be implemented as hardware, software, firmware or some combination thereof. While three separate controllers are illustrated within radio 330, other embodiments may have fewer, more, and/or different controllers for various different RATs that may be implemented in device 106.

Wi-Fi/BT Coexistence with Real Time Band Switching Based on Coexistence Profiles In at least some embodiments, a device may implement improved Wi-Fi/BT coexistence as follows.

At 402 the device may store a plurality of different coexistence profiles for different possible communication scenarios. Each coexistence profile may include values for each of a number of coexistence related parameters, which may include: mode, desense on/off, desense level, desense thresholds, SISO (single input single output) ack array, and/or TX chain power offsets, among possible others. In some embodiments, the coexistence profile may also indicate whether to use a pure TDD (Time Division Duplex) method of communication or a hybrid method of communication, where the hybrid method involves a combination of TDD and parallel transmission.

Thus each coexistence profile defines a set of operating parameter values used by the device when communicating. Each coexistence profile may be tailored to a specific set of communication conditions. In some embodiments, each coexistence profile may correspond to a specific (or range of) BT RSSI, Wi-Fi RSSI, number of BT devices and/or number of Wi-Fi devices. In some embodiments, one or more different coexistence profiles may be present for each frequency band. For example, there may be N different possible profiles for each band. In some embodiments, the device may store one or more coexistence profiles that are based on application type, e.g., may store at least one specific coexistence profile that is used when a certain application is executing on the device. The coexistence profiles may be stored as a plurality of data structures (e.g., tables), and a lookup table may be used for faster selection among different ones of these profiles.

At 404 the device may be initialized with first ones of the coexistence profiles. For example the device may be initialized with a default coexistence profile that is designed to be applicable to most common communication scenarios that may be encountered or that is designed for the current communication scenario. In some embodiments, the same coexistence profile may be used for each frequency band. In other embodiments, at initialization time, a respective different coexistence profile may be applied to the device for each frequency band. In some embodiments, the default coexistence profile (e.g., for each band) is set by the manufacturer and cannot be changed. In other embodiments, the default coexistence profile (e.g., for each band) may be periodically changed based on recent communication conditions that have been experienced or detected.

At 406, when the device encounters new communication conditions, the device may operate to dynamically select a different one of the coexistence profiles based on the current communication conditions. In some embodiments, the device monitors various communication parameters to assess current communication conditions, such as BT RSSI, Wi-Fi RSSI, number of BT devices with which the device is currently in communication, and/or the number of Wi-Fi devices with which the device is currently in communication. The device may monitor (e.g., continually or periodically) each of the above parameters to determine which coexistence profile to use. For example, the device may use these communication measurements to measure the effect that Bluetooth communication is having on Wi-Fi communication, or vice versa. As another example, if one or more of the signals are relatively strong, a coexistence profile may be selected that specifies a hybrid method for sharing the antenna and communication bandwidth between Bluetooth and Wi-Fi. Alternatively, if one or more of the signals are relatively weak, a coexistence profile may be selected that specifies a pure TDD method for sharing the antenna and communication bandwidth between Bluetooth and Wi-Fi.

Other environmental factors may also be considered. For example, if the device is a clamshell device, the current communication conditions may also take into account whether the device is currently in the open clamshell position or closed clamshell position. The use of different coexistence policies for open and closed modes of a device may be due to the difference between antenna isolation and/or antenna efficiency characteristics in these different modes. Other communication parameters may also be considered in addition to, or instead of, the above parameters in selecting a new coexistence profile. For example, the new coexistence profile may be selected at least in part based on the current application that is executing on the device, and/or the currently type of data traffic being conveyed. As one example, a different coexistence profile may be used for the transfer of multimedia streaming traffic. In some embodiments, a new coexistence profile is selected for a particular band on which the device is currently operating.

Thus, in selecting one of the coexistence profiles, the device may examine one or more of the Wi-Fi RSSI (Received Signal Strength Indicator), the Bluetooth RSSI, and the number of Wi-Fi and/or Bluetooth devices with which communication is currently occurring. In some implementations, other factors also can be considered, such as interfering devices and/or potentially interfering devices. The device may then dynamically select an appropriate coexistence profile based on the Wi-Fi RSSI, the Bluetooth RSSI, and the relative number of different devices. The coexistence profile is selected to provide the best possible Wi-Fi and/or Bluetooth output performance based on current conditions. In some embodiments, a new coexistence profile is selected during device operation every time the device switches band between 2.4 GHz and 5 GHz. Alternatively, a new coexistence profile may be selected based on one or both of the BT RSSI or Wi-Fi RSSI having changed greater than a certain threshold, or based on other factors.

At 408 the device may be configured according to the selected coexistence profile. In other words, the parameter values contained in the selected coexistence profile may be used to configure the device for communication. Thus, for example, the device may configure its transmit and/or receive operations according to the parameter values in the chosen coexistence profile. In some embodiments, the coexistence profile is accessed from memory based on a table lookup and used by the respective communication drivers, e.g., either or both of the Wi-Fi and BT drivers.

In some embodiments, the device may notify other devices to which the device is communicating about the selected coexistence profile, so that the other devices can be configured according to the same coexistence profile. In some embodiments, each device stores the same table of coexistence profiles, and one device can alert the others as to which coexistence profile is currently in use. For example, the first device can provide an identifier of the current coexistence profile to the other devices to which the first device is communicating, and the other devices can use this identifier to index into their respective lookup tables to determine the coexistence profile that they should currently be using. In some embodiments, devices can have both one or more common coexistence profiles and one or more individual coexistence profiles.

The device may repeatedly perform the above operations in 406 and 408, i.e., may repeatedly and dynamically select and use different coexistence profiles as conditions change. The device may thus operate to select different coexistence profiles on a second or even millisecond basis, as communication conditions change. For example, if the device is communicating with different devices in a peer to peer manner, the device may be changing frequency bands very often, possibly in the range of less than 100 ms for each change in frequency band. Thus the above operations in 406 and 408 may be repeated multiple times per second, as needed.

The above operations may be performed by the Wi-Fi software driver and/or the Bluetooth software stack and/or firmware (FW) to facilitate switching between different coexistence profiles in real time. This framework of coexistence profiles may provide better performance in communication scenarios that involve frequent channel and band switching.

Implement Hybrid/TDD Coexistence Solution Across Various Types of Devices.

Historically, computers have adopted a hybrid coexistence solution where the operating system implements TDD. However, with the convergence of a single operating system being used for both personal computers and other types of devices, the coexistence solution may be designed from use cases instead of being designed based on platform. For example, for a respective computer and operating system, the coexistence solution may be implemented with a hybrid/TDD combined coexistence solution based on the module/system configuration.

Advantages

The various embodiments described above may have some or all of the following advantages: (1) Previous coexistence solutions cannot fully support certain Wi-Fi communication features which include BTLE and Wi-Fi technologies (such as AWDL features). (2) The methods described herein for the first time implement hybrid/TDD switching based on Wi-Fi and BT RSSI thresholds. This implementation helps to improve Wi-Fi performance with module/system limitation. (3) Using the methods described herein, devices can support communication with multiple BT devices without significantly impairing Wi-Fi performance. (4) Selecting a BTLE mode for certain applications, such as voice recognition, frees up BT bandwidth for Wi-Fi, and thus provides a good balance between Wi-Fi and BT performance. (5) The methods described herein may operate to balance performance with battery life; and/or (6) The methods described herein may operate to remove line of sight restrictions relative to products available in the market.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processing element, such as a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A device which performs communications according to first and second short range wireless communication technologies, the device comprising:
   one or more antennas;
   a first radio for performing communication according to a first short range wireless communication technology;
   a second radio for performing communication according to a second short range wireless communication technology;
   a memory which stores a plurality of coexistence profiles, wherein each coexistence profile stores a plurality of coexistence parameter values;
   a processing element which is configured to:
      dynamically select a first coexistence profile of the plurality of coexistence profiles at runtime, wherein the first coexistence profile is selected based on current communication conditions being experienced by the device;
      wherein the selected first coexistence profile is used for at least one of the first short range wireless communication technology and the second short range wireless communication technology to provide improved communication performance; and
      notify at least one other device in communication with the device of the selected first coexistence profile, wherein the at least one other device is configured to operate according to the first coexistence profile based at least in part on the notification.

2. The device of claim 1,
   wherein the processing element is configured to dynamically select different coexistence profiles at different times based on current communication conditions being experienced by the device.

3. The device of claim 1,
   wherein each coexistence profile comprises two or more of a mode parameter, a desense parameter, a desense level, one or more desense thresholds, a SISO acknowledge array, and transmit chain power offsets.

4. The device of claim 1,
   wherein each coexistence profile is tailored to a specific set of communication conditions.

5. The device of claim 1,
   wherein each of at least a plural subset of the plurality of coexistence profiles corresponds to one or more of first short range wireless communication technology RSSI, second short range wireless communication technology RSSI, number of first short range wireless communication technology devices and/or number of second short range wireless communication technology devices.

6. The device of claim 1,
   wherein the plurality of coexistence profiles comprises one or more different coexistence profiles present for each frequency band.

7. The device of claim 1,
   wherein the plurality of coexistence profiles comprises one or more different coexistence profiles that are based on application type;
   wherein the processing element is configured to dynamically select a second coexistence profile of the plurality of coexistence profiles at runtime based on a current application type being executed.

8. The device of claim 1,
   wherein the first coexistence profile specifies one of a time division duplex (TDD) method and a hybrid method for sharing bandwidth between the first and second short range wireless communication technologies.

9. The device of claim 1,
   wherein the processing element is configured to dynamically select different coexistence profiles at runtime during at least some instances of switching between the first short range wireless communication technology and the second short range wireless communication technology.

10. The device of claim 1,
    wherein the first short range wireless communication technology is Bluetooth and the second short range wireless communication technology is Wi-Fi.

11. The device of claim 10,
    wherein the processing element is configured to dynamically select one of the plurality of coexistence profiles based on one or more of Bluetooth Received Signal Strength Indicator (RSSI), Wi-Fi RSSI, and a number of other devices to which the device is currently communicating.

12. An apparatus for inclusion in a device which performs communications according to first and second short range wireless communication technologies, the apparatus comprising:
    a memory which stores a plurality of coexistence profiles, wherein each coexistence profile stores a plurality of coexistence parameter values, wherein each of at least a subset of the coexistence profiles is adapted for a specific set of communication conditions;
    a processing element, wherein the memory is coupled to or comprised in the processing element, wherein the processing element is configured to:
       dynamically select different ones of the plurality of coexistence profiles at runtime, wherein the different ones of the plurality of coexistence profiles are selected based on current communication conditions being experienced by the device;
       wherein selected ones of the plurality of coexistence profiles are used for at least one of the first short range wireless communication technology and the second short range wireless communication technology to provide improved communication performance; and
       notify at least one other device in communication with the device of a selected one of the plurality of coexistence profiles, wherein the at least one other device is configured to operate according to the selected one of the plurality of coexistence profiles based at least in part on the notification.

13. The apparatus of claim 12,
    wherein each coexistence profile comprises two or more of a mode parameter, a desense parameter, a desense level, one or more desense thresholds, a SISO acknowledge array, and transmit chain power offsets.

14. The apparatus of claim 12,
wherein each of at least a subset of the plurality of coexistence profiles corresponds to one or more of first short range wireless communication technology RSSI, second short range wireless communication technology RSSI, number of first short range wireless communication technology devices and/or number of second short range wireless communication technology devices.

15. The apparatus of claim 12,
wherein the plurality of coexistence profiles comprises one or more different coexistence profiles present for each frequency band.

16. The apparatus of claim 12,
wherein the plurality of coexistence profiles comprises one or more different coexistence profiles that are based on application type;
wherein the processing element is configured to dynamically select different coexistence profiles of the plurality of coexistence profiles at runtime based on a current application type being executed.

17. A device which performs communications according to first and second short range wireless communication technologies, the device comprising:
one or more antennas;
a first radio for performing communication according to a first short range wireless communication technology;
a second radio for performing communication according to a second short range wireless communication technology;
a processor which is configured to:
dynamically select among a first bandwidth sharing implementation and a second bandwidth sharing implementation at runtime during at least some instances of switching between the first short range wireless communication technology and the second short range wireless communication technology, wherein the bandwidth sharing implementation is selected based on current communication conditions being experienced by the device;
wherein the selected bandwidth sharing implementation is used for sharing of bandwidth between the first short range wireless communication technology and the second short range wireless communication technology to provide improved communication performance; and
notify at least one other device in communication with the device of the selected bandwidth sharing implementation, wherein the at least one other device is configured to operate according to the same bandwidth sharing implementation based at least in part on the notification.

18. The device of claim 17,
wherein the first bandwidth sharing implementation is time division duplex and the second bandwidth sharing implementation is hybrid.

19. The device of claim 17,
wherein the first short range wireless communication technology is Bluetooth and the second short range wireless communication technology is Wi-Fi.

20. The device of claim 17,
wherein the current communication conditions comprise on one or more of Bluetooth Received Signal Strength Indicator (RSSI), Wi-Fi RSSI, and a number of other devices to which the device is currently communicating.

* * * * *